United States Patent [19]
Erickson et al.

[11] 3,779,782
[45] Dec. 18, 1973

[54] BENTONITE BINDER COMPOSITION
[75] Inventors: Donald V. Erickson, Virginia;
Eugene L. Palusky, Eveleth, both of Minn.
[73] Assignee: United States Steel Corporation, Pittsburgh, Pa.
[22] Filed: May 20, 1971
[21] Appl. No.: 145,575

[52] U.S. Cl................. 106/72, 106/73, 106/DIG. 4
[51] Int. Cl............................................ C04b 33/12
[58] Field of Search.................. 106/72, 73, DIG. 4

[56] References Cited
UNITED STATES PATENTS
3,115,416   12/1963   Chavrier ............................. 106/72
3,240,616   3/1966   Harasowski et al .................. 106/72

Primary Examiner—James E. Poer
Attorney—John E. Callaghan

[57] ABSTRACT

A bentonite binder composition and method of preparation is disclosed. The binder composition is particularly useful for pelletizing iron ore fines. It is prepared by intimately combining and mixing wet bentonite in a stockpile with soda ash, the moisture in the wet bentonite bringing about reaction to form an improved binder after a suitable aging period.

6 Claims, No Drawings

BENTONITE BINDER COMPOSITION

BACKGROUND

Iron ore fines in the form of hardened pellets are well known blast furnace charging materials. Where the source of iron is taconite the ore must be ground very fine prior to beneficiation to increase the percentage content of iron oxide. The beneficiated iron ore fines are mixed with a binder and tumbled in a drum to produce pellets of relatively low strength which are then dried to give them better resistance to breakage during shipment as well as improved abrasion resistance in a blast furnace.

A common binder for iron ore fines is bentonite. Bentonite alone will greatly increase the structural strength of iron-ore pellets and aid in forming round pellets.

The usual practice is to dry crude bentonite to approximately 6 percent by weight moisture and then grind it to approximately 80 percent minus 200 mesh prior to shipment. The crude bentonite is stored in stockpiles prior to drying and grinding.

It was known before this invention that sodium carbonate (soda ash) would improve bentonite's capability to bind iron ore into pellets and reduce the total amount of bentonite required for binding a given quantity of iron ore fines. The sodium in soda ash can be made to replace some of the calcium and magnesium in the bentonite lattice and thereby improve bentonite for this use. However, it was believed heretofore that bentonite would not combine with sodium carbonate except when a solution of sodium carbonate is employed to make the ion replacement.

Addition of dry sodium carbonate (soda ash) to the dried bentonite has been attempted. The results of using bentonite combined with sodium carbonate after the bentonite had been dried did not indicate any significant reduction of the bentonite consumption nor an improvement of the greenball and/or fired iron ore pellet quality. However, when sodium carbonate is put into solution and sprayed onto an iron ore concentrate on a conveyor belt prior to mixing the bentonite and concentrates, an increase in greenball and fired iron ore pellet quality along with a reduction in bentonite consumption is noted. However, a system for spraying of the sodium carbonate as described above requires substantial capital expenditures and increased operating costs for sodium carbonate storage, heating, pumping and spraying equipment.

OBJECTS

It is therefore an object of this invention to provide a method of preparing an improved binder composition which avoids the use of solutions and the capital investment required. Another object of this invention is to provide an improved bentonite binder for iron ore fines agglomeration. A further object of this invention is to provide a method of producing a bentonite binder which can utilize crude soda ash.

SUMMARY OF THE INVENTION

The invention provides an improved bentonite binder for iron ore fines agglomeration and an improved method for the preparation thereof. In the method of the invention, soda ash having a density of about 40 to about 75 pounds per cubic foot, at least 30 percent having a particle size such that it will pass a 200 mesh screen and no more than 10 percent being retained on an 80 mesh screen is mixed in an amount of about 40 to about 120 lbs. per ton of bentonite, the bentonite having a moisture content of about 20 to about 35 percent by weight and then the mixture is allowed to age for at least 24 hours. The method of the invention can be carried out very simply by mixing 40 to 120 pounds of soda ash having the properties set forth above per ton of bentonite which is crude bentonite having a moisture content of about 20 to about 35 percent by weight in a stockpile by mixing alternate layers of bentonite and soda ash and then raking and/or plowing the soda ash into the bentonite to thoroughly mix the two together and allowing the stockpile to age for at least 24 hours as discussed in more detail below.

DETAILED DESCRIPTION

Any suitable soda ash may be used in accordance with the invention, but it is preferred to use a soda ash having particle sizes in the ranges which follow:

| Size % Plus | Range % |
|---|---|
| 40 mesh | 4.0 – 12.0 |
| 80 mesh | 67.0 – 80.0 |
| 100 mesh | 75.0 – 90.0 |
| 200 mesh | 97.0 – 99.0 |
| −200 mesh | 3.0 – 1.0 |

It is preferred that the soda ash have a composition in the following ranges:

| | % by Weight |
|---|---|
| $Na_2CO_3$ | 99.6 – 99.9 |
| NaCl | 0.02 – 0.04 |
| $Na_2SO_4$ | 0.05 – 0.13 |

It is pointed out, however, that while it is preferred to have a light soda ash and that the density and particle size are critical to the invention within the range of about 30 to about 75 pounds per cubic foot for density and at least 30 percent of the soda ash must be capable of passing 200 mesh and no more than 10 percent being retained on 80 mesh, that crude forms of soda ash including trona may be used in accordance with the invention with satisfactory results.

Any suitable bentonite may be used but it is preferred to use a western or high sodium bentonite. Southern bentonite can be used but this would require more aging and consequently the southern bentonite is not preferred. Furthermore, a bentonite having a pH in the range of 8.5 to 10 and the following composition gives the best results:

| Composition % | % by Weight |
|---|---|
| Fe | 2.9 – 5.5 |
| $Al_2O_3$ | 17.0 – 21.5 |
| $SiO_2$ | 57.0 – 67.0 |
| $Na_2O$ | 1.8 – 2.7 |
| CaO | 1.7 – 2.6 |
| MgO | 1.5 – 2.8 |
| $H_2O$ | 25.0 – 30.0 |

The amount of moisture in the crude bentonite is critical. A bentonite containing 20 percent by weight water gives satisfactory results but one containing 15 percent by weight of water will not give satisfactory results as this amount of moisture is not enough to bring about ion transfer so that the amount of binder required is significantly reduced to give satisfactory greenball strength.

The combination of bentonite with soda ash should be such that there is from about 40 to about 120 pounds soda ash per ton of bentonite and it is preferred to use from about 60 to about 80 pounds of soda ash per ton of bentonite. Forty pounds is satisfactory to give a reasonable reduction in the amount of bentonite/soda ash combination required as a binder for satisfactory strength in binding iron ore fines. Above 120 pounds per ton of bentonite there is excess soda ash in the mixture which is not required and is therefore uneconomical. A good range for most purposes is from about 60 to about 80 pounds of soda ash per ton of bentonite.

In practicing the method of this invention the crude wet bentonite is mixed with the specified quantity of soda ash by any suitable method. Thorough mixing is required and this can be obtained by metering the soda ash onto the conveyor as the crude wet bentonite goes onto the stockpile or by depositing the bentonite in layers, e.g. about 1 foot thick, interspersed with layers of the required amount of soda ash and raking or discing the soda ash into the bentonite to thoroughly mix the two together.

Any aging period of 24 hours or longer is satisfactory. One to two weeks aging will absolutely insure proper ion transfer. After mixing and aging, the binder material is dried and ground to the desired fineness in accordance with standard procedure. The binder, after aging, is preferably dried to a moisture content below 10 percent by weight and most preferably about 6 percent by weight and preferably ground to at least 50 percent minus 200 mesh and most preferably about 80 percent minus 200 mesh.

The binder composition of the invention may be used in many applications where such binders have been used heretofore but it is particularly suitable for binding taconite iron ore fines concentrate. Taconite iron ore concentrate is pelletized by mixing the binder of the invention in a suitable amount with taconite concentrate in balling drums and then heat treating. The pellets from the balling drum are referred to as "green balls." Tests are used to determine green ball strength, namely the green ball drop tests and the green ball compression test. The drop test is the average number of drops from a height of 18 inches required to break 20 pellets. The compression strength is the load in pounds required to break a pellet. The same test is used for fired pellets. The drop test value should be above 10 drops and the green ball compression strength should be above 10 pounds. Fired pellet compression strength should preferably be above 500 pounds.

It is desirable for mid Mesabi range taconite, to be able to operate the balling drum while using less than 15 pounds of binder per ton of taconite concentrate while maintaining the drop test, green ball and fired pellet compression strength above the minimum values set forth above. With the standard amount of bentonite of about 18-20 pounds per ton of concentrate, it is possible to operate the balling drums satisfactorily and still obtain satisfactory pellets. As will become readily apparent from the following working examples which are given for the purpose of illustration only, when the method of the invention is used, it is possible to reduce the bentonite to less than 15 pounds per ton of concentrate and still obtain satisfactory pellets. Those skilled in the art will recognize that these amounts are only applicable to mid Mesabi range taconite and that the invention is broadly applicable to reduction of bentonite consumption for all types of iron ore fines agglomeration.

EXAMPLES

The examples are summarized in the following table. Taconite concentrate which has been dried to remove substantially all moisture (about 9–10 percent by weight) and having a particle size of 90 percent minus 270 mesh is mixed with the bentonite binders shown in the amounts shown in the table and passed to a balling drum. Balls ⅜ to 1 inch in diameter are collected by screening and grate kiln agglomerated in accordance with standard practice. The drop test and compression strengths are as shown in the table.

The binder used in Examples 1–3 was prepared as follows: Crude bentonite having the following composition:

| Percent | | | | | | | |
|---|---|---|---|---|---|---|---|
| Total Fe | Al₂O₃ | SiO₂ | Na₂O | CaO | MgO | H₂O | pH |
| 2.90 | 18.00 | 64.00 | 2.40 | 1.90 | 2.00 | 28.0 | 9.0 | was mixed with soda ash having the following composition:

| | % by Weight |
|---|---|
| Na₂CO₃ | 99.6 – 99.9 |
| NaCl | 0.02 – 0.04 |
| Na₂SO₄ | 0.05 – 0.13 | and a particle size such that at least 30 percent passes 200 mesh and no more than 10 percent is retained on 80 mesh and having a density of 47 pounds per cubic foot, in the amount of 55 pounds of soda ash per ton of bentonite in a stockpile by spreading soda ash over approximately one foot layers of the bentonite and discing (with a farm type disc) until the soda ash and bentonite were thoroughly mixed prior to adding subsequent layers. The stockpile was left undisturbed to age for two weeks and then after drying to 6 percent moisture and grinding to 80 percent minus 200 mesh is used for binding the taconite concentrate.

In Example 4 bentonite of the same composition as in Examples 1–3 was used but without soda ash addition. In each of Examples 1–4 it was possible to control the commercial equipment without undue difficulty in screening, dust in the kiln or other problems.

TABLE

| Ex. No. | lbs Bentonite/ Ton Concentrate | Greenball Drop Test | Greenball Compression lbs | Fired Pellet Compression lbs |
|---|---|---|---|---|
| 1 | 13.7 | 11.8 | 10.6 | 619 |
| 2 | 13.4 | 11.5 | 10.7 | 556 |
| 3 | 13.6 | 10.8 | 10.0 | 619 |
| 4 | 18.4 | 11.7 | 12.5 | 613 |

These examples are given for the purpose of illustration only and it is to be understood that other methods within the scope of the disclosure may be used. "Mesh" as is used throughout is Tyler Mesh.

We claim:

1. A method of preparing an improved bentonite binder for iron ore agglomeration which comprises:
   a. forming a mixture of sodium carbonate and bentonite by combining a substantially dry sodium carbonate having a density of about 40 – 75 lbs/cubic foot, at least 30 percent passing 200 mesh and no more than 10% being retained on 80 mesh, with bentonite having a moisture content of about 20 to about 35 percent by weight, said carbonate being in an amount of about 40 to about 120 lbs/ton of said bentonite, b. allowing said mixture to exchange sodium ions for calcium ions in said bentonite for a period of at least 24 hours, and
c. drying said mixture to a moisture content of less than about 10 percent by weight.

2. The method of claim 1 wherein said bentonite is a high sodium bentonite.

3. The method of claim 1 wherein said bentonite has the composition

| Composition | % by Weight |
|---|---|
| % Total Fe | 2.9 – 5.5 |
| % $Al_2O_3$ | 17.0 – 21.5 |
| % $SiO_2$ | 57.0 – 67.0 |
| % $Na_2O$ | 1.8 – 2.7 |
| % CaO | 1.7 – 2.6 |
| % MgO | 1.5 – 2.8 |
| % $H_2O$ | 25.0 – 30.0 |
| pH | 8.6 – 9.7 |

4. The method of claim 1 wherein said sodium carbonate has a density of about 47 pounds per cubic foot and sizes in the following ranges:

| Size % Plus | Range % |
|---|---|
| 40 mesh | 4.0 – 12.0 |
| 80 mesh | 67.0 – 80.0 |
| 100 mesh | 75.0 – 90.0 |
| 200 mesh | 97.0 – 99.0 |
| −200 mesh | 3.0 – 1.0 |

5. The method of claim 1 wherein said sodium carbonate has a composition in the following ranges:

| | % by Weight |
|---|---|
| $Na_2CO_3$ | 99.6 – 99.9 |
| NaCl | 0.02 – 0.04 |
| $Na_2SO_4$ | 0.05 – 0.13 |

6. The method of claim 1 wherein said sodium carbonate is used in the form of trona.

* * * * *